US010067667B2

United States Patent
Shakespeare

(10) Patent No.: US 10,067,667 B2
(45) Date of Patent: *Sep. 4, 2018

(54) METHOD AND APPARATUS FOR TOUCH GESTURES

(71) Applicant: Oracle International Corporation, Redwood Shores, CA (US)

(72) Inventor: Darryl M. Shakespeare, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 14/948,685

(22) Filed: Nov. 23, 2015

(65) Prior Publication Data

US 2016/0077704 A1 Mar. 17, 2016

Related U.S. Application Data

(62) Division of application No. 13/541,203, filed on Jul. 3, 2012, now Pat. No. 9,229,568.

(60) Provisional application No. 61/541,910, filed on Sep. 30, 2011.

(51) Int. Cl.
G06F 3/0488 (2013.01)
G06F 3/041 (2006.01)

(52) U.S. Cl.
CPC .......... *G06F 3/0488* (2013.01); *G06F 3/0416* (2013.01); *G06F 3/04883* (2013.01)

(58) Field of Classification Search
CPC ................... G06F 3/017; G06F 3/0488; G06F 2203/04808
See application file for complete search history.

(56) References Cited

U.S. PATENT DOCUMENTS

| 8,219,936 | B2 | 7/2012 | Kim et al. |
| 8,296,681 | B2 | 10/2012 | Nurmi |
| 2005/0210417 | A1 | 9/2005 | Marvit et al. |
| 2006/0101354 | A1 | 5/2006 | Hashimoto et al. |
| 2008/0055273 | A1 | 3/2008 | Forstall |
| 2008/0168405 | A1 | 7/2008 | Tolmasky et al. |
| 2009/0225037 | A1 | 9/2009 | Williamson et al. |
| 2010/0162165 | A1 | 6/2010 | Addala et al. |

(Continued)

OTHER PUBLICATIONS

Mouse Gestures—obtained at http://optimoz.mozdev.org/gestures/; Sep. 29, 2011; 2 pages.

*Primary Examiner* — Andrea Long
(74) *Attorney, Agent, or Firm* — Trellis IP Law Group, PC

(57) ABSTRACT

A system and method for facilitating employing touch gestures to control or manipulate a web-based application. The example method includes employing a browser running on a device with a touch-sensitive display to access content provided via a website; determining a context associated with the content, including ascertaining one or more user interface controls to be presented via a display screen used to present the content, and providing a first signal in response thereto; receiving touch input from a touch-sensitive display and providing a second signal in response thereto; and using the second signal to manipulate the display screen in accordance with the context associated with the content presented via the display screen. A library of touch gestures can represent common functions through touch movement patterns. These gestures may be context sensitive so as not to conflict with default touch tablet gestures.

20 Claims, 4 Drawing Sheets

(56) References Cited

U.S. PATENT DOCUMENTS

2010/0295783 A1 11/2010 El Dokor et al.
2011/0179381 A1 7/2011 King
2012/0133579 A1 5/2012 Prieur et al.
2012/0173963 A1 7/2012 Hoke et al.

METHOD AND APPARATUS FOR TOUCH GESTURES

CROSS REFERENCES TO RELATED APPLICATIONS

This application is a divisional of and claims priority to U.S. patent application Ser. No. 13/541,203, entitled TOUCH DEVICE GESTURES, filed on Jul. 3, 2012, which claims the benefit of U.S. Provisional Patent Application Ser. No. 61/541,910, entitled TOUCH DEVICE GESTURES, filed on Sep. 30, 2011, all of which are hereby incorporated by reference as if set forth in full in this application for all purposes.

BACKGROUND

The present application relates to software, and more specifically to software for facilitating use of gestures with web-based applications.

Software for facilitating use of gestures is employed in various demanding applications, including software running on tablets and smart phones with touch-sensitive displays. Such applications often demand software that recognizes intuitive gestures that do not conflict with tablet or smartphone default gestures.

Conventionally, software for handling touch gestures input via a touch-sensitive display uses default gestures of the computing device running the software. Use of gestures is often limited to navigating user interface display screens of the operating system of the device, such as switching between applications, activating and closing applications, and so on. Furthermore, in cases where gesture control features are built into an application running on the device, such gestures may conflict with default gestures used by the accompanying device.

SUMMARY

An example method facilitates employing touch gestures to control or otherwise affect a web-based application or user interface display screen associated therewith. The example method includes employing a browser running on a device with a touch-sensitive display to access content provided via a website; determining a context associated with the content, including ascertaining one or more user interface controls to be presented via a display screen used to present the content, and providing a first signal in response thereto; receiving touch input from a touch-sensitive display and providing a second signal in response thereto; and using the second signal to manipulate the display screen in accordance with the context associated with the content presented via the display screen.

In a more specific embodiment, the example method further includes employing one or more scripts provided with the content to execute one or more of the steps of the method. The content includes computer code for facilitating translating one or more touch gestures into a user interface control signal to control a display screen presented via the browser. The example method further includes providing the computer code with content retrieved from a server that hosts the website.

Determining the context includes employing computer code to determine one or more user interface controls present in a user interface display screen presented via the browser and then configuring one or more functions to be associated with one or more touch gestures based on the user interface controls. Example functions include closing the web-based application; performing a find or search; performing an add operation in a form of the display screen; and so on. The computer code, which is executed via a client and retrieved from a server, is employed to translate one or more touch gestures provided via a touch-sensitive display to activate the one or more functions.

The example method further includes employing the computer code and context to ensure that the one or more touch gestures do not conflict with one or more default touch gestures employed by a computing device employing the touch-sensitive display. The one or more touch gestures may include multi-touch gestures.

Examples of touch gestures that may be employed in various implementations include a single finger cross swipe, a single finger swipe down, a single finger caret swipe, a single finger checkmark, a three finger swipe downward on a grid of data, and a three finger swipe upward on a grid of data for performing a close or cancel, a find, an add, a select, a find on a grid, and a next-page operation, respectively.

Hence, certain embodiments discussed herein may facilitate employing context-sensitive touch gesture user interface functionality with web-based applications, such as enterprise applications deployed via a network. Conventionally, enterprise web-based applications are devoid of touch functionality.

Generally, web applications running on a touch device often do not take advantage of the touch capabilities of the device other than the simple mouse single click. Various embodiments discussed herein can provide ways to translate common application functions into context sensitive touch gestures.

DETAILED DESCRIPTION OF EMBODIMENTS

For the purposes of the present discussion, a web-based application may be any software application that is accessible via a browser and the instructions of which may be provided as content from a server.

Touch input may be any input, such as input via a gesture, provided to a computing device via a touch-sensitive display. A gesture may be any movement that involves motion to trigger a signal to control or otherwise affect a user interface display screen.

A user interface display screen may be any software-generated depiction presented on a display. Examples of depictions include windows, dialog boxes, displayed tables, and any other graphical user interface features, such as user interface controls, presented to a user via software, such as a browser.

A user interface control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
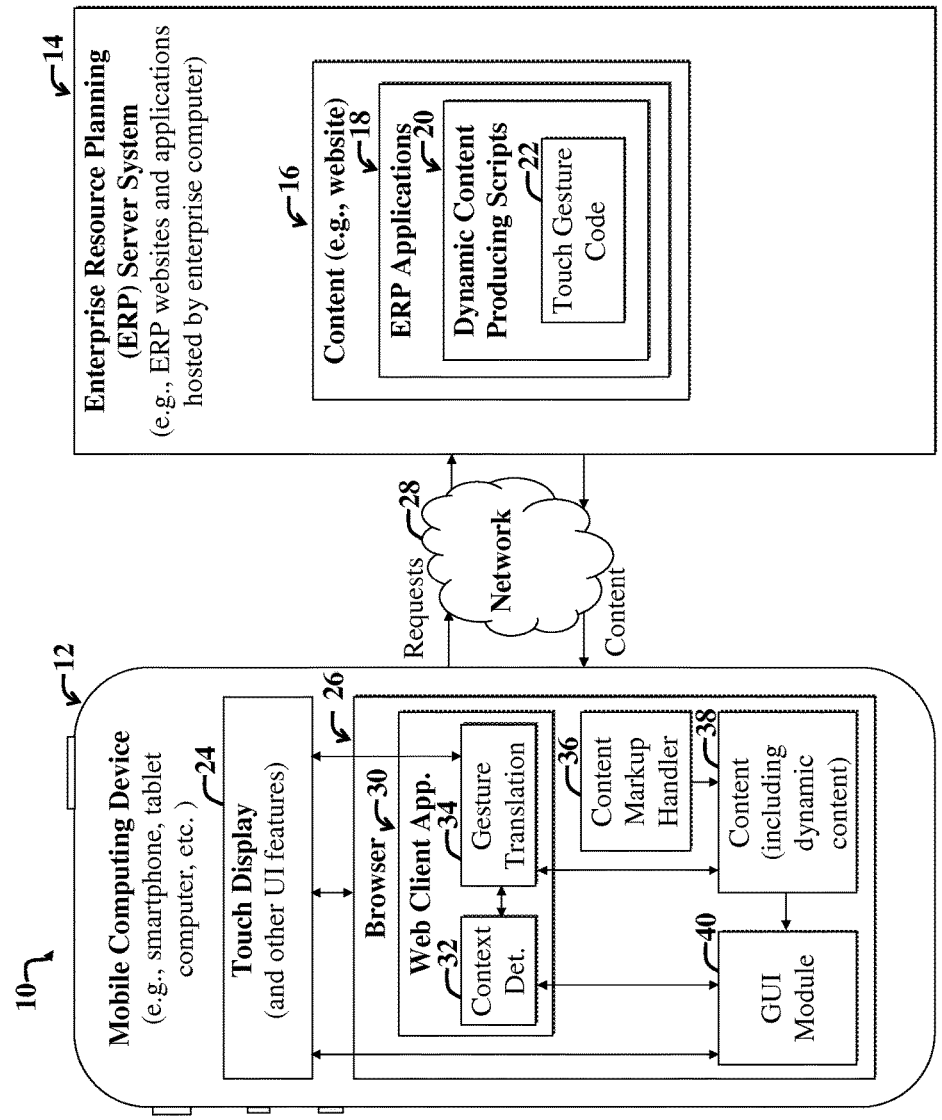
FIG. 1 is a diagram illustrating an example computing environment and accompanying system for employing context-sensitive touch gestures to control web-based applications via a touch-sensitive display.

FIG. 1 is a diagram illustrating an example computing environment and accompanying system 10 for employing context-sensitive touch gestures to control web-based applications via a touch-sensitive display, called a touch display 24. The example system 10 includes a mobile device 12, such as a smartphone or tablet mobile computing device, in communication with an Enterprise Resource Planning (ERP) server 14, which hosts content 16. The content 16 includes ERP software 18, including scripts or applications to be executed on the mobile device 12, which is called the client.

For the purposes of the present discussion, ERP software may be any set of computer code that is adapted to facilitate managing resources of an organization. Example resources include Human Resources (HR), financial resources, assets, employees, and so on, of an enterprise. The terms "ERP software" and "ERP application" and "ERP script" may be employed interchangeably herein. However, an ERP application may include one or more ERP software modules, scripts, or other components, such as user interface software modules or components. An ERP system may be any infrastructure, i.e., resources, such as hardware and ERP software, used to facilitate managing resources of an organization.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

In the present example embodiment, the ERP applications 18 included in the server-side content 16 include dynamic content-producing scripts 20, including computer code 22. The dynamic content-producing scripts 20 may be retrieved and executed by the mobile device 12 to facilitate implementing touch gesture controls, as discussed more fully below.

The example mobile device 12 includes the touch display 24 in communication with a browser 26. The browser 26, such as Safari, includes a web client application 30, which may access retrieved content 38 and may communicate with a browser Graphical User Interface (GUI) module 40. The web client application 30 may be initially included in content retrieved from the ERP server 14 and then executed on the mobile device 12.

The web client application 30 includes a gesture translation module 34 in communication with a context determination module 32. A content markup handler 36 may parse content and execute scripts to generate dynamic content, which is provided as client-side content 38. The client-side content 38 may be accessed by the web client application 30, e.g., to facilitate determining context of content to be displayed via a user interface display screen to be presented via that touch display 24, as discussed more fully below.

For the purposes of the present discussion, dynamic content may be any content that is generated via a script. A script may be any computer program, or component, function, or procedure thereof adapted to perform one or more tasks.

Certain scripts may be executed via a browser, e.g., the browser 26, which may run on a computer that is separate from a content server, e.g., the ERP server 14, that hosts content that includes the script. Such a browser is called a client browser. A client browser may be any browser software running on a client computer or system, such as the mobile device 12. A browser may be any software adapted to access and/or traverse content available via a computer network, such as an enterprise network and/or the World Wide Web. A client may be any computer or system that is adapted to receive content from another computer or system, called a server. A content server may be any server that is adapted to provide a resource, e.g., data or functionality, to a client.

Content may be any resource or collection of resources, which may include data and/or functionality, such as a web page, file, streaming audio and/or video, and so on. Proxied content may be any content that is provided to a consuming resource, such as computer and/or program, via an intermediate proxy. The consuming computer and/or program (or collection thereof) is called the client. A server may be any computing resource, such as a computer and/or software that is adapted to provide content to another computing resource or entity that requests it, i.e., the client.

In an example operative scenario, a user employs the mobile device 12 to issue requests for content to the ERP server 14 via a network 28, such as the Internet. The ERP server 14 then selectively provides content to the mobile device 12 in response to the requests.

In the present example operative scenario, the user employs the mobile device 12 to request dynamic content 20 from the ERP server 14. The dynamic content 20 returned by the ERP server 14 initially includes the touch gesture code 22. The touch gesture code 22 is transferred to the content markup handler 36 for client-side execution, resulting in installation of the web client application 30. Subsequent requests for content may result in retrieval of webpages and accompanying forms, data grids or tables, webpage scripts, and so on, for display via the touch display 24.

Webpage markup is transferred to the content markup handler 36, which includes computer code for preparing the client-side content 38 for display via the GUI module 40 and touch display 24. The context determination module 32 of the web client application 30 may scan the content 38 or otherwise determine the content displayed via the touch display 24 by communicating with the GUI module 40 and/or directly with the touch display 24. By scanning or otherwise accessing the content 38, computer code included in the context determination module 32 can determine a context associated with content displayed via the touch display 24.

The context, i.e., contextual information, may indicate, for example, that a web-based form or table is currently being displayed, and the form or table has a search field, an OK button, a close or cancel user interface control, and so on. Generally, for the purposes of the present discussion, a context associated with content may be any information characterizing the content, such as information indicating that the content is a form on a webpage; that the content includes a search field; that the content includes a data grid or table, and so on.

The context of the user interface display screen displayed via the touch display 24 is used by computer code running on the gesture translation module 34 to determine which touch gestures, as discussed more fully below, are applicable to the currently displayed user interface display screen.

For the purposes of the present discussion, a touch gesture may be any input provided to a touch-sensitive display by touching the display. A display may be touched with one or more fingers and/or other objects or devices, such as a stylus. A multi-touch gesture may be any gesture that involves contacting a touch-sensitive display simultaneously at different positions on the display. A gesture may include motion across a display or a tap at a predetermined position or any position of the display. Certain touch gestures may include touching the display and moving fingers or other devices in certain patterns across the display or across certain portions of the display to trigger different user interface input signals to control the user interface display screens and accompanying applications.

Note that while various components of the system 10 are represented by separate modules, various modules may be integrated or combined into one or more modules, or modules shown included in other modules may be separated out, without departing from the scope of the present teachings. Furthermore, the system 10 may be implemented on a single computer system or may be distributed among computing resources of a network.

Note that while the present embodiment pertains to client-side execution of scripts downloaded from a server, embodiments are not limited thereto. For example, in certain implementations, functionality for implementing context-sensitive touch gestures for web-based applications may be executed on the server 14, i.e., server-side. In this case, certain control signals generated in response to a touch gesture may be forwarded from the mobile device 12 to the ERP server 14 for processing.

Figure 2:
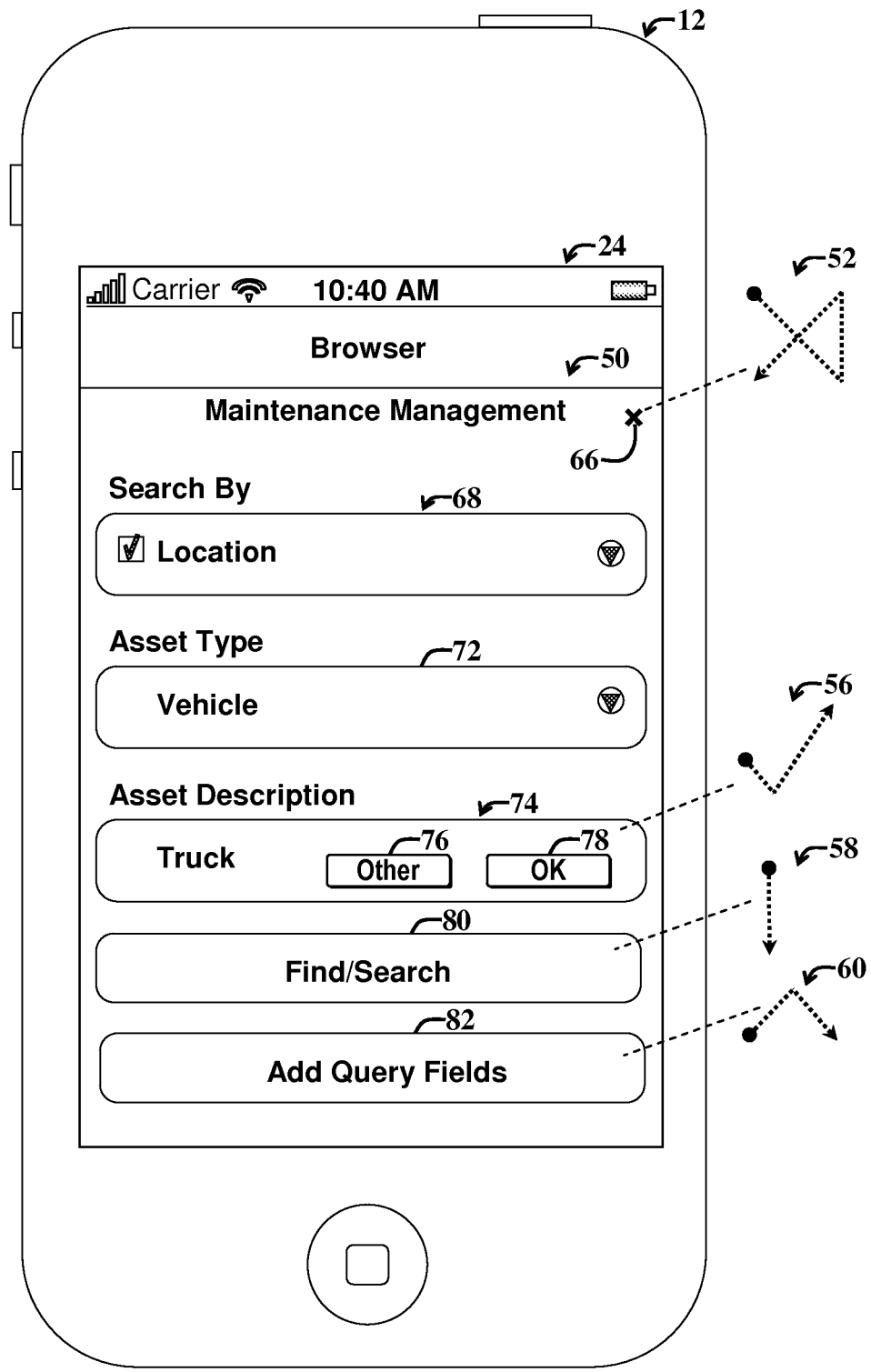
FIG. 2 is a diagram illustrating a first example user interface display screen presenting a first example webpage displayable via the mobile device touch-sensitive display of FIG. 1 and responsive to various context-sensitive touch gestures.

FIG. 2 is a diagram illustrating a first example user interface display screen presenting a first example webpage 50 displayable via the mobile device touch-sensitive display 24 and responsive to various context-sensitive touch gestures 52-60.

The example maintenance management webpage 50 is illustrated in a browser window and includes an example form for implementing a search for one or more enterprise assets. The example form includes a close control 66 in an upper right portion of the webpage 50, a search-by user interface section 68, an asset-type section 72, an asset-description section 74, a find button 80, and an add button 82.

With reference to FIGS. 1 and 2, in the present example embodiment, a special single finger cross swipe gesture 52 has been associated with the close control 66 by the web client application 30 of FIG. 1. The web client application 30 determines that the context of the webpage includes display of a form that includes the close button 66, and consequently enables the single finger cross swipe gesture 52 for closing of the currently displayed webpage form 50. Ensuring that the close button 66 occurs in the webpage 50 prior to associating the close control 66 with the gesture 52, may ensure that use of the gesture 52 will not conflict with other default gestures of the mobile device 12. The single finger cross swipe gesture 52 is said to be associated with a close function that is associated with the close control 66.

The search-by user interface section 68 includes a drop-down menu listing search mechanisms with accompanying check boxes. In the present example embodiment, a user has chosen to search for assets by location.

The asset-description section 74 displays an indication (i.e., "Truck") determined based on user input provided in the asset-type section 72. A user option ("Other") 76 enables a user to select a different indication, e.g., car, bus, etc. An OK button 78 enables a user to accept the asset description.

With reference to FIGS. 1 and 2, the web client application 30 has determined that the webpage form 50 includes an OK button 78 for making an "OK" selection. Accordingly, the web client application 30 enables association of a single finger check mark swipe gesture 56 with the "OK" selection, such that use of the single finger check mark swipe gesture 56 on the touch display 24 will trigger the "OK" selection.

For the purposes of the present discussion, an "OK" selection may be any user interface input or interaction that is adapted to cause or confirm entry of data in a webpage, e.g., accompanying form, search field, and so on, or that is otherwise adapted to indicate that a user is confirming that the user has completed viewing, entering data, and/or otherwise making selections in a user interface display screen. An example mechanism for implementing an "OK" selection includes the OK button 78, an enter button, a DONE button, or one or more predetermined touch gestures.

The web client application 30 of FIG. 1 has determined that the webpage form 50 includes a find button 80. Accordingly, a single finger swipe down gesture 58 is associated with the find button 80 so that use of the gesture on the touch display 24 causes initiation of function, i.e., search function, associated with the find button 80.

The web client application 30 of FIG. 1 has determined, based on the context of the webpage 50, that an add button 82 occurs in the currently displayed form thereof. Accordingly, a single finger caret swipe 60 is associated by the web client application 30 with the add button 82 so that use of the single finger caret swipe 60 on the touch display 24 causes triggering of an add function associated with the add button 82.

Figure 3:
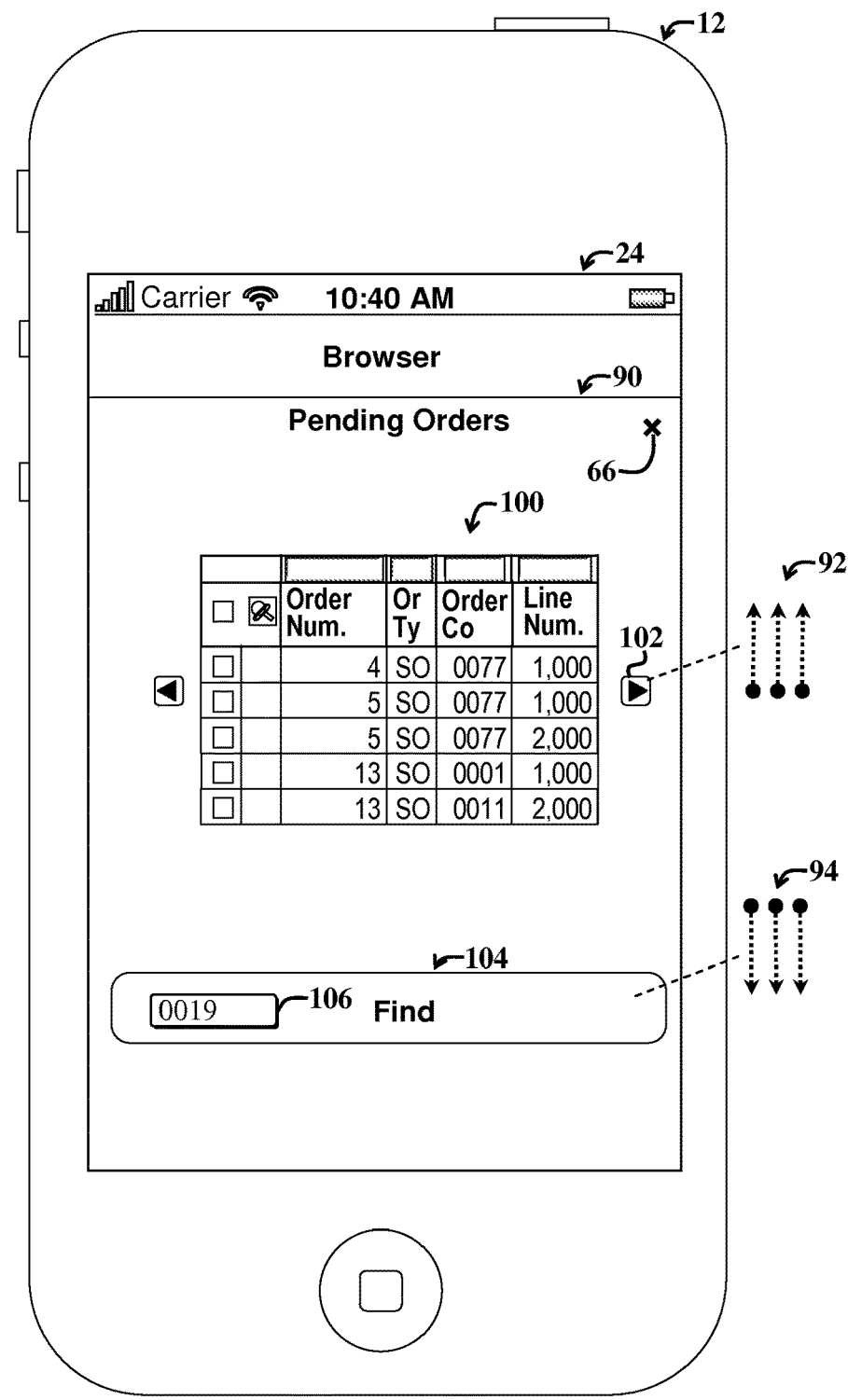
FIG. 3 is a diagram illustrating a second example user interface display screen presenting a second example webpage displayable via the mobile device touch-sensitive display of FIG. 1 and responsive to various context-sensitive touch gestures.

FIG. 3 is a diagram illustrating a second example user interface display screen presenting a second example webpage 90 displayable via the mobile device touch-sensitive display 24 and responsive to various context-sensitive touch gestures 92, 94.

The second example webpage 90 displays table, i.e., data grid 100 and includes a "next page" button 102. The webpage 90 further includes a find button 104 and accompanying search field 106.

With reference to FIGS. 1 and 3, the web client application 30 determines that the webpage 90 displays a table with a "next page" button 102 and a find button 104. Accordingly, an upward three finger swipe gesture 92 is enabled for the grid 100, such that when a user employs three fingers in an upward swiping motion on the grid area 100 of the touch display 24, a "next page" operation associated with the "next page" button 102 is triggered. Similarly, a downward three finger swipe gesture 94 is enabled for the grid 100, such that when a user employs three fingers in a downward swiping motion on the touch display 24, a "find" operation associated with the find button 104 is triggered.

For the purposes of the present discussion, a "next page" operation may be any action performed by software to display a different or subsequent webpage or user interface display screen content than what is currently displayed via a display.

Figure 4:
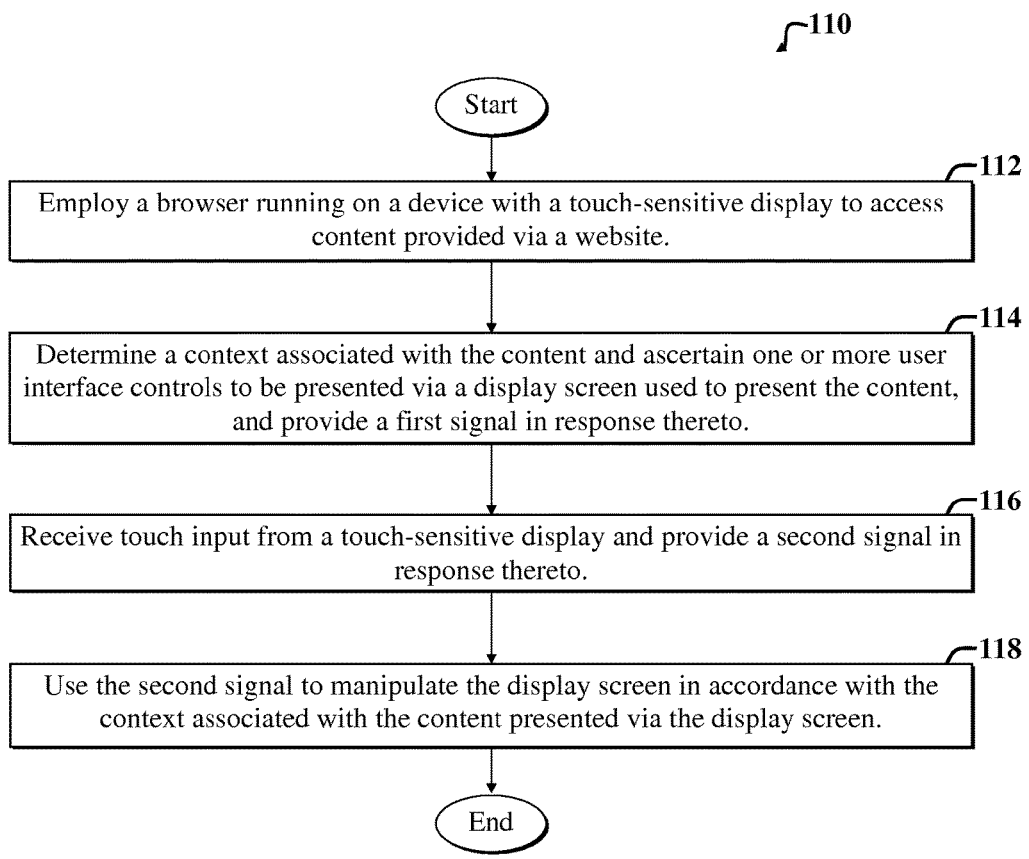
FIG. 4 is a flow diagram of an example method adapted for use with the embodiments of FIGS. 1-3.

FIG. 4 is a flow diagram of an example method 110 adapted for use with the embodiments of FIGS. 1-3. The example method 110 includes a first step 112, which involves employing a browser running on a device with a touch-sensitive display to access content provided via a website.

A second step 114 includes determining a context associated with the content, including ascertaining one or more user interface controls, such as find buttons, close controls, OK buttons, and so on, to be presented via a display screen used to present the content, and providing a first signal in response thereto. With reference to FIG. 1, the first signal may represent a signal output from the context determination module to the gesture translation module 34.

A third step 116 includes receiving touch input from a touch-sensitive display and providing a second signal in response thereto. With reference to FIG. 1, the second signal may include a signal sent from the touch display 24 to the gesture translation module 34 of the browser 26.

A fourth step 118 includes using the second signal to manipulate the display screen in accordance with the context associated with the content presented via the display screen. With reference to FIG. 1, the gesture translation module 34 may encode the touch gesture input as a control signal corresponding to a particular user interface function that is associated with a displayed user interface control. The control signal may then be forwarded to the GUI module 40 and/or content 38, which may execute one or more scripts to effectuate a change in the user interface display screen based on the determined touch gesture.

Note that various steps of the method 110 may be altered, augmented, rearranged, or omitted without departing from the scope of the present teachings. For example, the method 110 may further include one or more of the following steps: detecting that a form is being displayed on the display screen; determining that the user has drawn a single finger cross swipe on the touch-screen; and in response to the determining and detecting, causing the form on the display screen to close.

The method 110 may further include: detecting that a form is being displayed via the display screen; determining that the user has drawn a single finger swipe line down on the touch-screen; and in response to the determining and detecting, causing a search of data in the form.

The method 110 may further include: detecting that a form is being displayed via the display screen; determining that the user has drawn a single finger caret swipe on the touch-screen; and in response to the determining and detecting, causing an addition of at least two data items in the form.

The method 110 may further include: detecting that a form is being displayed via the display screen; determining that the user has drawn a single finger check mark swipe on the touch-screen; and in response to the determining and detecting, causing a select in the form.

The method 110 may further include: detecting that a form is being displayed via the display screen; determining that the user has drawn a three finger swipe downward on the touch-screen overlapping, at least in part, a grid; and in response to the determining and detecting, performing a find operation on the grid.

The method 110 may further include: detecting that a form is being displayed via the display screen; determining that the user has drawn a three finger swipe upward on the touch-screen overlapping, at least in part, a grid; and in response to the determining and detecting, performing a next page operation on the grid.

A preferred embodiment of the invention is included in the "EnterpriseOne™ version 8.98.4.5" product manufactured and distributed by Oracle® Systems, Inc.

A library of touch gestures can represent common functions through touch movement patterns. For instance, as discussed above, the closing of a window, page, form, etc. in a web page or application can be performed by drawing the letter 'X' with a finger or stylus on the screen of a touch-screen device. Drawing the letter 'X' represents a single finger cross swipe gesture. These gestures are context sensitive, so as not to conflict with default touch tablet gestures. In summary, examples of several gestures and their functions are listed in the following table.

TABLE 1

| Gesture Name | Action |
|---|---|
| Single Finger Cross Swipe | Performs a 'close' or 'cancel' if one of these operations are on the form. Gesture resembles the letter 'X' |
| Single Finger Swipe Down | Performs a 'find' (search) if the find operation is on the form. Gesture resembles the letter 'I' |
| Single Finger Caret Swipe | Performs an 'add' if the Add operation is on the form. Gesture resembles the letter 'A' |
| Single Finger Check Mark Swipe | Performs a 'select' or 'OK' if one of these operations are on the form. Gesture resembles a check mark. |
| Three finger swipe downward on a grid of data | Perform a 'find' operation on the grid targeted. |
| Three finger swipe upward on a grid of data | Perform a 'next page' operation on the grid targeted |

Being able to represent contextual functions using logical representations of actions in the form of gestures can increase productivity and ease of use of the touch table interaction with applications running on the web or other network. Gestures, as presented herein, represent intuitive context-sensitive gestures, exemplified by the signal finger cross swipe gesture, since drawing the letter "X" to perform a close function is analogous to the appearance of a standard close button in existing interfaces.

Although the description has been described with respect to particular embodiments thereof, these particular embodiments are merely illustrative, and not restrictive. For example, although details of the invention have been described with particular attention to web-based applications, features may be adaptable to other types of computer processing such as standalone applications, operating systems, and so on.

For example, while the present application is discussed with respect to systems and methods for employing context-sensitive gestures to control enterprise web-based applications via a mobile device with a touch-sensitive display, embodiments are not limited thereto. For example, use of certain intuitive gestures and accompanying methods for determining the context of a user interface display screen to thereby adjust functionality associated with a touch gesture, as discussed herein, may be employed in applications other than web-based applications. Furthermore, certain methods discussed herein may be extended generally to implementations for facilitating enabling touch-control inputs for various software applications that might not otherwise be inherently coded for touch-sensitive inputs.

Variations are possible from the specific gesture patterns presented herein while still retaining advantages of the patterns such as efficiency, intuitiveness, etc. For example, "lines" in the patterns need not be perfectly straight. The patterns may be larger or smaller than those shown. In some embodiments the patterns need not be exactly symmetrical and can have slight deviations from the ideal patterns presented. The patterns may be translated such as by using horizontal or vertical reflections, rotations, etc.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A computer implemented method for employing touch gestures to control a software application, the method comprising:
    employing a touch-sensitive display on a device to access a user interface of the software application;
    determining default touch gestures used by the device to manipulate the software application through operation of the user interface;
    determining a context associated with the user interface; and
    determining, from the context associated with the user interface and the default touch gestures, a set of touch gestures that are non-conflicting with the default touch gestures when operating one or more user interface controls of the software application via the user interface, wherein the set of touch gestures includes at least one common touch gesture configured to operate at least one of the one or more user interface controls also operable by a default touch gesture.

2. The method of claim 1, wherein the method further includes:
    displaying a form on the touch-sensitive display;
    detecting a finger swipe touch gesture on the touch-sensitive display;
    determining a shape of the finger swipe touch gesture; and
    operating the form in response to the shape of the finger swipe touch gesture.

3. The method of claim 2, wherein in response to determining that the shape of the finger swipe touch gesture is a single finger cross swipe, causing the form presented on the touch-sensitive display to close.

4. The method of claim 2, wherein in response to determining that the shape of the finger swipe touch gesture is a single finger line swipe down on the touch screen, causing a search of the data in the form.

5. The method of claim 2, wherein in response to determining that the shape of the finger swipe touch gesture is a single finger caret swipe, causing an addition of at least two data items in the form.

6. The method of claim 2, wherein in response to determining that the shape of the finger swipe touch gesture is a single finger check mark swipe, causing a select action in the form.

7. The method of claim 2, wherein in response to determining that the shape of the finger swipe touch gesture is a three finger swipe downward on the touch-sensitive display overlapping, at least in part, a grid, causing a find operation on the grid.

8. The method of claim 2, wherein in response to determining that the shape of the finger swipe touch gesture is a three finger swipe downward on the touch-sensitive display overlapping, at least in part, a grid, performing a next page operation on the grid.

9. The method of claim 1, wherein determining, from the context associated with the user interface and the default touch gestures, the set of touch gestures that are non-conflicting further comprises:
    in response to the context associated with the user interface and the default touch gestures, determining which touch gestures of the set of touch gestures perform the same operation on the user interface as one or more of the default touch gestures associated with the user interface.

10. The method of claim 1, wherein the set of touch gestures comprise intuitive context-sensitive gestures.

11. A non-transitory computer-readable medium including instructions executable by a digital processor, the computer-readable medium including one or more instructions for:
   employing a touch-sensitive display on a device to access a user interface of a software application;
   determining default touch gestures used by the device to manipulate the software application through operation of the user interface;
   determining a context associated with the user interface; and
   determining, from the context associated with the user interface and the default touch gestures, a set of touch gestures that are non-conflicting with the default touch gestures when operating one or more user interface controls of the software application via the user interface, wherein the set of touch gestures includes at least one common touch gesture configured to operate at least one of the one or more user interface controls also operable by a default touch gesture.

12. The non-transitory computer-readable medium of claim 11, wherein the one or more instructions further include:
   displaying a form on the touch-sensitive display;
   detecting a finger swipe touch gesture on the touch-sensitive display;
   determining a shape of the finger swipe touch gesture; and
   operating the form in response to the shape of the finger swipe touch gesture.

13. The non-transitory computer-readable medium of claim 12, wherein in response to determining that the shape of the finger swipe touch gesture is a single finger cross swipe, causing the form presented on the touch-sensitive display to close.

14. The non-transitory computer-readable medium of claim 12, wherein in response to determining that the shape of the finger swipe touch gesture is a single finger line swipe down on the touch screen, causing a search of the data in the form.

15. The non-transitory computer-readable medium of claim 12, wherein in response to determining that the shape of the finger swipe touch gesture is a single finger caret swipe, causing an addition of at least two data items in the form.

16. The non-transitory computer-readable medium of claim 12, wherein in response to determining that the shape of the finger swipe touch gesture is a single finger check mark swipe, causing a select action in the form.

17. The non-transitory computer-readable medium of claim 12, wherein in response to determining that the shape of the finger swipe touch gesture is a three finger swipe downward on the touch-sensitive display overlapping, at least in part, a grid, causing a find operation on the grid.

18. The non-transitory computer-readable medium of claim 12, wherein in response to determining that the shape of the finger swipe touch gesture is a three finger swipe downward on the touch-sensitive display overlapping, at least in part, a grid, performing a next page operation on the grid.

19. The non-transitory computer-readable medium of claim 11, wherein determining, from the context associated with the user interface and the default touch gestures, the set of touch gestures that are non-conflicting further comprises:
   in response to the context associated with the user interface and the default touch gestures, determining which touch gestures of the set of touch gestures perform the same operation on the user interface as one or more of the default touch gestures associated with the user interface.

20. The non-transitory computer-readable medium of claim 11, wherein the set of touch gestures comprise intuitive context-sensitive gestures.

* * * * *